United States Patent [19]

Vissers et al.

[11] 4,156,758

[45] May 29, 1979

[54] ELECTROLYTE COMPOSITION FOR ELECTROCHEMICAL CELL

[75] Inventors: Donald R. Vissers, Naperville; Zygmunt Tomczuk, Orland Park; Karl E. Anderson, Westchester; Michael F. Roche, Downers Grove, all of Ill.

[73] Assignee: The United States of America as represented by the United States Department of Energy, Washington, D.C.

[21] Appl. No.: 932,153

[22] Filed: Aug. 9, 1978

[51] Int. Cl.$^2$ .............................................. H01M 6/36
[52] U.S. Cl. .................................................... 429/112
[58] Field of Search ........................ 429/103, 112, 221

[56] References Cited

U.S. PATENT DOCUMENTS

| | | | |
|---|---|---|---|
| 3,898,096 | 8/1975 | Heredy et al. | 429/112 |
| 3,941,612 | 3/1976 | Steunenberg et al. | 429/103 |
| 4,011,373 | 3/1977 | Kaun et al. | 429/221 |

Primary Examiner—Donald L. Walton
Attorney, Agent, or Firm—Dean E. Carlson; Frank H. Jackson; Hugh W. Glenn

[57] ABSTRACT

A high-temperature, secondary electrochemical cell that employs FeS as the positive electrode reactant and lithium or lithium alloy as the negative electrode reactant includes an improved electrolyte composition. The electrolyte comprises about 60–70 mole percent LiCl and 30–40 percent mole percent KCl which includes LiCl in excess of the eutectic composition. The use of this electrolyte suppresses formation of the J phase and thereby improves the utilization of positive electrode active material during cell cycling.

6 Claims, No Drawings

ELECTROLYTE COMPOSITION FOR ELECTROCHEMICAL CELL

CONTRACTUAL ORIGIN OF THE INVENTION

The invention described herein was made in the course of, or under, a contract with the UNITED STATES DEPARTMENT OF ENERGY.

BACKGROUND OF THE INVENTION

The present invention relates to a new electrolyte composition for use in secondary electrochemical cells that employ metal sulfides in the positive electrode and alkali metals in the negative electrode. The development has particular application in a cell that employs FeS as the positive electrode reactant and lithium as the negative electrode reactant. The lithium may be in elemental or alloy form.

A substantial amount of work has been done in the development of high-temperature, secondary electrochemical cells. Positive electrodes in these cells have included chalcogens such as sulfur, oxygen, selenium, or tellurium, and their transition metal chalcogenides as positive electrode materials. The sulfides of iron, cobalt, nickel, and copper are of current interest. Alkali metals and alkaline earth metals such as lithium, sodium, potassium, calcium, magnesium, and alloys of these materials are contemplated as negative electrode reactants. Alloys of these materials such as lithium-aluminum, lithium-silicon, lithium-magnesium, calcium-magnesium, calcium-aluminum, calcium-silicon, and magnesium-aluminum have been investigated to maintain the negative electrode in solid form and improve retention of the negative electrode reactant at high cell-operating temperatures.

In high-temperature secondary cells of this type, current flow between the electrodes is transmitted by molten electrolytic salt. Particularly useful salts include compositions of the alkali metal halides and the alkaline earth metal halides ordinarily incorporating a salt of the negative electrode reactant, e.g. lithium. Eutectic compositions of two or more salts ordinarily are used to minimize melting and cell-operating temperatures. One particularly useful salt composition is the eutectic composition of LiCl-KCl including 58.2 mole percent LiCl and 41.8 mole percent KCl with a melting temperature of 352° C.

The sulfides of iron have received considerable attention as candidates for the positive electrode materials. One of the more formidable difficulties that has impeded the development of cells using these materials, particularly FeS has been the formation of the phrase termed "J phase" ($LiK_6Fe_{24}S_{26}Cl$). The formation of J phase within the positive electrode has been associated with the reluctance of the cells to discharge completely or to fully recharge. This results in low utilization of the FeS positive electrode reactant material and an overall decrease in cell performance.

A number of attempts have been made to suppress formation of the J phase and thereby improve cell performance. One quite successful method has been the addition of sulfides of copper e.g. $Cu_2S$ to the FeS in the formation of the positive electrode material. Cells with such positive electrode compositions have performed very well for long periods of time. However, after extended cycling, copper metal has been found to deposit within the electrode separators causing electrical shorts and a diminution of cell life.

PRIOR ART STATEMENT

The following patents are related to the subject matter but do not teach or suggest the present invention:

Steunenberg et al., U.S. Pat. No. 3,941,612, 2 Mar. 1976. This patent discloses a high-temperature, secondary electrochemical cell including lithium as the negative electrode reactant and FeS as the positive electrode reactant. The problem of J phase formation within the positive electrode is discussed and an additive of a sulfide of copper is proposed to suppress the formation of this phase. At column 8, lines 40-65, it is seen that the utilization of active material at a typical cell-operating temperature of about 450° C. is increased by the addition of $Cu_2S$ to suppress formation of J phase. At no point does this reference recognize or otherwise teach that the adjustment of electrolyte composition can effectively suppress J phase formation.

Kaun et al., U.S. Pat. No. 4,011,373, 8 Mar. 1977. This patent illustrates and describes typical cells that employ iron sulfides such as FeS as positive electrode reactants and lithium alloys as negative electrode reactants. Example 1 of the reference illustrates a LiAl/FeS secondary electrochemical cell using a eutectic composition of LiCl-KCl as electrolyte. Copper is added to the positive electrode composition to improve utilization.

Buzzelli, U.S. Pat. No. 3,607,413, 21 Sept. 1971. This patent discloses a method for electrochemically alloying aluminum and lithium. Column 3, lines 5-15, suggests several molten salt electrolytes including LiCl-KCl and LiCl-KCl-NaCl. The reference suggests that eutectic mixtures are advantageously employed to minimize melting points.

SUMMARY OF THE INVENTION

In view of the problems associated with the prior art of high temperature electrochemical cells, it is an object of the present invention to provide an alkali metal/metal-sulfide secondary electrochemical cell with improved utilization of the positive electrode material.

It is a further object to provide a lithium/iron-sulfide electrochemical cell in which J phase formation is suppressed.

It is also an object to provide an electrolyte composition for an FeS/alkali metal electrochemical cell including LiCl and KCl salts to effectively suppress formation of J phase and improve the utilization of the FeS in the positive electrode.

In accordance with the present invention an electrochemical cell is provided including FeS as positive electrode reactant, lithium, in alloy or elemental form, as negative electrode reactant and an electrolyte containing LiCl and KCl. The electrolyte composition includes 60-70 mole percent LiCl and 30-40 mole percent KCl. The use of this electrolyte composition results in the improved utilization of FeS during the cell operation.

DETAILED DESCRIPTION OF THE PREFERRED EMBODIMENT

The improved electrochemical cell of the present invention includes an electrolyte composition that contains lithium chloride and potassium chloride but with sufficient lithium chloride to be in excess of the LiCl-KCl eutectic and to suppress the formation of J phase ($LiK_6Fe_{24}S_{26}Cl$) during cell cycling. The suppression of J phase facilitates the charging and discharging of the positive electrode reactant and thereby increases reactant utilization and cell performance.

An electrolyte composition having such properties is adapted for use with positive electrodes containing sulfides of iron as the positive electrode reactant and alkali metals as the negative electrode reactant. This electrolyte is particularly well-suited for use in cells that employ FeS and Li as the reactants in accordance with the following reaction:

$$FeS + 2Li \rightarrow Li_2S + Fe$$

Cells that employ $FeS_2$ as the positive electrode reactant generally are not characterized by high levels of J phase formation.

Positive electrodes including FeS as reactant are prepared by various well known techniques, some of which are illustrated in the references cited above in the Prior Art Statement. The FeS reactant material can be blended in particulate form with electrolytic salt or other binder material and compacted or otherwise integrated into a porous plaque. For instance, the plaque can be solidified through polymerization and possibly carbonization of the thermosetting material as is disclosed in Kaun, U.S. Pat. No. 4,011,374, 8 Mar. 1977. Other electrode preparation techniques include vibratorily loading particulate reactant material into a porous electrically conductive substrate as described in Gay et al., U.S. Pat. No. 3,933,520, 20 Jan. 1976.

Negative electrodes in the secondary cells include an alkali metal such as lithium in alloy or in elemental form as the reactant. Sodium negative electrodes are also conceivable in cells employing the present invention. The negative electrodes including lithium often employ alloys of lithium-aluminum or lithium-silicon to stabilize and retain the active material. These alloys can be prepared by electrochemical deposition onto a porous substrate of e.g. aluminum or by suitable metallurgical preparation of the lithium alloy, for instance, as is illustrated in Settle et al., U.S. Pat. No. 3,957,532, 18 May 1976. Particulate lithium alloy can be integrated into an electrode structure in much the same manner as described for the positive electrodes.

Electrolyte in accordance with the present invention can be prepared by beginning with a commercially available, eutectic composition of LiCl-KCl having 41.8 mole percent KCl and 58.2 mole percent LiCl. This eutectic salt can be heated at controlled temperature conditions to a temperature corresponding to the liquidus temperature of the desired electrolyte composition. Additional LiCl, in particulate form, can be blended into the melt until the liquidus or saturation concentration of LiCl is observed, that is when the LiCl particulates no longer dissolve or recrystallize from the molten mixture. As an example, a controlled temperature of 425° C. corresponds to a saturation of liquidus concentration containing 67.5 mole percent LiCl and 32.5 mole percent KCl. An electrolyte having this or other composition also can be prepared merely by weighing the desired amount of the individual constituents and fusing the material together into a uniform composition.

Various additives in small proportions can be blended with the LiCl and KCl within the electrolyte composition. For example, up to about 10 mole percent sodium chloride may be included in order to minimize the use of the expensive LiCl and to improve electrode kinetics.

The following example is presented to illustrate one specific embodiment of the present invention and to demonstrate improvements over a conventional electrochemical cell employing a eutectic electrolyte composition.

EXAMPLE I (Cell DK-86)

An electrochemical cell is assembled in the discharge state with particulate Fe, $Li_2S$ and graphite fiber compacted together with electrolyte to form the positive electrode. The negative electrode included a mixture of Al and LiAl powder in a porous iron substrate. A eutectic composition that is 41.8 mole percent KCl and 58.2 mole percent LiCl was employed as the electrolyte. The cell was electrochemically charged to form FeS in the positive electrode and additional LiAl in the negative electrode. After collecting operating data with the eutectic electrolyte composition, additional LiCl was added to the cell to increase the LiCl composition to 67.5 mole percent with 32.5 mole percent KCl. The operating results are listed below in Table I.

Table I also includes data relating to other electrolyte compositions including 53, 64, and 70 mole percent lithium chloride.

TABLE I

| Electrolyte Composition (mol % LiCl) | Liquidus Temperature ° C. | Mole Ratio Li+/K+ | Current Density (mA/cm²) | | Utilization (%) | |
|---|---|---|---|---|---|---|
| | | | Charge | Discharge | 450° C. | 500° C. |
| 53 | 425 | 1.13 | 50 | 50 | 25 | 46 |
| | | | 150 | 100 | 16 | 28 |
| | | | 100 | 50 | 14 | 50 |
| | | | 100 | 100 | 14 | 40 |
| 58 Eutectic Composition | 352 | 1.38 | 50 | 50 | 53 | 70 |
| | | | 50 | 10 | 39 | 53 |
| | | | 100 | 50 | 43 | 61 |
| | | | 100 | 100 | 44 | 55 |
| 64 | 400 | 1.7 | 50 | 50 | 74 | 77 |
| | | | 50 | 100 | 73 | 74 |
| | | | 100 | 50 | 68 | 70 |
| | | | 100 | 100 | 68 | 71 |
| 67 | 425 | 2.08 | 50 | 50 | 91 | 90 |
| | | | 50 | 100 | 90 | 89 |
| | | | 100 | 50 | 83 | 84 |
| | | | 100 | 10 | 85 | 86 |
| 70 | 440 | 2.33 | | | | |

It is clear from the results illustrated in the Example and in Table I that a substantial increase in the utilization of FeS is provided with small changes in the electrolyte concentration. It is expected that at least an increase of LiCl to 60 mole percent from the 58 mole percent eutectic composition is required to obtain significant increases in utilization. It is also expected that increases above 70 mole percent lithium chloride will provide diminishing returns in cell performance as utilization is already at a high level. The results from Table I also show that the variation in reactant utilization resulting from temperature is substantially reduced through the use of electrolyte rich in lithium chloride.

In other small cell tests the positive electrodes were examined by X-ray diffraction and by metallographic examination in both the charged and the discharged states. J phase formation was minimal in FeS electrodes operating in cells having the LiCl-rich electrolyte of the present invention.

It is therefore seen from the above that use of an electrolyte composition including about 60–70 mole percent LiCl in KCl gives a substantial improvement in FeS utilization over a cell that employs the eutectic composition of LiCl/KCl as electrolyte. Particularly good utilization is exhibited between about 64 to 68 mole percent LiCl as is seen from Table I. This is believed to occur as a result of the suppression of J phase formation within the positive electrode during cycling.

It is to be understood that even in the ordinary commercially available LiCl-KCl eutectic small variations in constituent composition may occur. The electrolyte composition of the present invention includes additional lithium chloride at a level in addition to these minor and inconsistent variations which cannot be relied upon to effect the advantages attributed to the present improved electrochemical cell. It will also be understood that although the present invention has been described in terms of particular embodiments of cell structure, variations in material and processing steps known to those skilled in the art can be made in accordance with the present invention.

The embodiments of the invention in which an exclusive property of privilege is claimed are defined as follows:

1. In a secondary electrochemical cell comprising a positive electrode with FeS as a reactant, a negative electrode with lithium in alloy or elemental form as a reactant and an electrolyte including LiCl and KCl, the improvement wherein said electrolyte comprises a composition of about 60 to 70 mole percent LiCl and about 30 to 40 mole percent KCl.

2. In the electrochemical cell of claim 1 wherein said electrolyte composition includes LiCl in excess of the eutectic composition and has a liquidus temperature of 400°–425° C.

3. In the electrochemical cell of claim 1 wherein said electrolyte composition comprises about 64–68 mole percent LiCl.

4. In the electrochemical cell of claim 1 wherein said electrolyte composition includes up to about ten mole percent NaCl.

5. In the electrochemical cell of claim 1 wherein LiCl is included in said electrolyte composition in an amount in excess of the LiCl-KCl eutectic composition and in an amount sufficient to suppress J phase formation within said positive electrode.

6. In the electrochemical cell of claim 1 wherein said electrolyte composition is completely molten at the cell-operating temperatures.

* * * * *